United States Patent
Beuning et al.

(10) Patent No.: US 10,069,176 B2
(45) Date of Patent: Sep. 4, 2018

(54) LITHIUM ION BATTERY HEATER SYSTEMS AND METHODS

(71) Applicant: Textron Innovations Inc., Providence, RI (US)

(72) Inventors: Charles Bernard Beuning, Wichita, KS (US); Vernon Weng-Yew Chang, Wichita, KS (US)

(73) Assignee: Textron Innovations, Inc., Providence, RI (US)

(*) Notice: Subject to any disclaimer, the term of this patent is extended or adjusted under 35 U.S.C. 154(b) by 0 days.

(21) Appl. No.: 15/790,552

(22) Filed: Oct. 23, 2017

(65) Prior Publication Data

US 2018/0108951 A1   Apr. 19, 2018

Related U.S. Application Data (62) Division of application No. 14/517,206, filed on Oct. 17, 2014, now Pat. No. 9,831,534.

(60) Provisional application No. 61/892,801, filed on Oct. 18, 2013.

(51) Int. Cl.
| | |
|---|---|
| *H05B 1/02* | (2006.01) |
| *H01M 10/44* | (2006.01) |
| *H01M 10/633* | (2014.01) |
| *H01M 10/615* | (2014.01) |
| *H01M 10/657* | (2014.01) |

(52) U.S. Cl.
CPC ....... *H01M 10/443* (2013.01); *H01M 10/615* (2015.04); *H01M 10/633* (2015.04); *H01M 10/657* (2015.04); *H01M 2220/20* (2013.01); *H01M 2220/30* (2013.01)

(58) Field of Classification Search
CPC ............. H01M 10/443; H01M 10/615; H01M 10/633; H01M 10/657; H01M 2220/20; H01M 2220/30; H05B 1/0236; H05B 3/0042
USPC ................ 219/494, 497, 505, 202, 205, 492
See application file for complete search history.

(56) References Cited

U.S. PATENT DOCUMENTS

| | | |
|---|---|---|
| 4,777,350 A | 10/1988 | Crocket et al. |
| 6,259,229 B1 | 7/2001 | Ashtiani et al. |
| 8,452,490 B2 | 5/2013 | Lakirovich et al. |
| 9,126,499 B2 | 9/2015 | Han |

(Continued)

OTHER PUBLICATIONS

Chang, et al., "System Integration of a Safe, High, Power, Lithium Ion Main Battery Into a Civil Aviation Aircraft," SAE International, ISSN 0148-7191, Nov. 2, 2010.

(Continued)

*Primary Examiner* — Mark Paschall
(74) *Attorney, Agent, or Firm* — Erise IP, P.A.

(57) ABSTRACT

A battery heater system for a battery used in cold weather operations and methods for using the battery heater system are described. Embodiments of the battery heater system may incorporate a heater switch with an indicator, a timer circuit, a controller, a voltage meter, a temperature transducer, and a heating element. In some methods of using the device, the battery powers the heating element for a fixed cycle time based on the time to discharge the battery at a cold-soaked temperature. In other methods of using the device, the battery powers the heating element for a varying cycle time as necessary to discharge the battery to a discharge cut-off voltage value. In other methods of using the device, the heating element is operated using a duty cycle that is varied based on the battery temperature.

18 Claims, 8 Drawing Sheets

(56) References Cited

U.S. PATENT DOCUMENTS

| | | |
|---|---|---|
| 9,214,706 B2 | 12/2015 | Xu et al. |
| 2003/0186111 A1 | 10/2003 | Tamakoshi |
| 2010/0164437 A1 | 7/2010 | McKinley |
| 2012/0092018 A1 | 4/2012 | Scheucher |
| 2012/0133329 A1 | 5/2012 | Yoshida et al. |
| 2014/0285135 A1 | 9/2014 | Ji et al. |

OTHER PUBLICATIONS

Chang, et al., "Development and Test of Safe, High Power Lithium Ion Main Batteries for General Aviation Aircraft," SAE International, Paper # 2008-01-2884 Nov. 11, 2008.

Chang, et al., "Lithium Ion Batteries Take Their Seat," Aerospace Engineering, pp. 6-13, May 18, 2011.

LITHIUM ION BATTERY HEATER SYSTEMS AND METHODS

RELATED APPLICATION

This application is a divisional application of U.S. patent application Ser. No. 14/517,206 filed Oct. 17, 2014, which claims the benefit of U.S. Patent Application Ser. No. 61/892,801 filed Oct. 18, 2013, the disclosure of which is incorporated herein by reference.

BACKGROUND OF THE INVENTION

The battery heater systems and methods described herein are in the field of battery devices. More specifically, the systems and methods disclosed herein are in the field of heaters for batteries for use in any aircraft, vehicle, mobile, or stationary devices exposed to extended cold temperatures. The systems and methods related also to aircraft batteries and internal heaters that are integrated into aircraft batteries. The systems and methods also relate to a self-powered battery heater system where the battery heater system is powered by the battery itself.

Batteries used to start vehicles such as aircraft and other heavy equipment may be required to produce significant current to support the starting and operation of the vehicle in which they are installed. Similarly, batteries used to power stationary or mobile devices, such as computers, laptops, mobile phones, and other electronic equipment, may need to operate in cold environments. When the vehicles or other devices are located or operated in cold environments, the batteries may become cold-soaked to the ambient temperature of the environment during periods when the vehicle is not in use. In some cases aircraft may be exposed to temperatures down to −45 degrees C. for extended periods. Batteries at these cold temperatures may be incapable of performing properly if they are used to attempt to start an engine, for example, because of frozen electrolyte or other effects of the low temperature.

Typically, when an aircraft will be exposed to such low temperatures for an extended time, the batteries may need to be removed from the aircraft and placed in a temperature-controlled environment to prevent electrolyte freezing. Aircraft batteries may be difficult to remove and reinstall in an aircraft, especially by personnel wearing cold weather clothing and gloves as would typically be required.

If it is impractical to remove the battery, the battery will get so cold that its electrolyte will freeze. When frozen, the electrolyte's viscosity will increase and will create a high internal resistance in the battery which resists the flow of Lithium ions and electrons necessary to sustain a high voltage and continuous current needed to start an aircraft engine or power a heater. In such situations, an external power source, such as a ground power cart, is necessary to provide electrical power to operate heaters provided for the battery, which may be internal heaters. Such external power sources may not be available at small airports or remote cold weather locations. If an external power source with a higher sustained nominal voltage (e.g. 28V) is available, the battery heater system will not need to employ any time, voltage, or duty cycle-based algorithm and can operate normally at full power up to the target temperature.

The dependence on either preventing electrolyte freezing or an external power sources is due to the assumption that the heater will operate at a consistent power level at its nominal voltage and current requirements. Furthermore the heater is operated using control logic focused on reaching and maintaining a target temperature. The inventive heater system and methods described herein are designed to use the limited power available in the cold batteries to self-heat.

BRIEF SUMMARY OF THE INVENTION

The new devices and methods described herein provide an improved battery capable of using its own electrochemical cells with frozen or cold electrolyte to discharge electrical energy in a manner that enables its heating elements to warm up the cold soaked battery. A battery with this battery heater system will not be required to be removed from an aircraft in a cold temperature environment for room temperature storage, nor will it be dependent on external power to preheat the battery.

In some embodiments of the invention, the method for operating an electrical heater to heat one or more electrochemical cells disposed in the battery case comprises the steps of determining a power-on time period and a power-off time period, discharging the electrochemical cells through the electrical heater for the power-on time period, and disconnecting the electrochemical cells from the electrical heater for the power-off time period. The battery is heated by sequentially discharging the electrochemical cells through the heater followed by disconnecting the heater from the electrochemical cells to allow the battery voltage to recover, and those processes are repeated until the temperature of the electrochemical cells are at or above a target temperature.

In some embodiments, determining a power-on time period is done by discharging the electrochemical cells through the electrical heater until the voltage of the electrochemical cells drops to a discharge cut-off voltage and measuring the time period elapsed until the voltage of the electrochemical cells dropped to the discharge cut-off voltage.

In some embodiments, determining a power-off time period is performed by disconnecting the electrochemical cells from the electrical heater when the voltage of the electrochemical cells drops to the discharge cut-off voltage and then measuring the time period elapsed until the voltage of the electrochemical cells recovers to its open circuit voltage.

In some embodiments, the power-on time period and the power-off time period are determined when the temperature of the electrochemical cells are a selected temperature, such as a temperature of approximately −40 degrees C. In some embodiments the time periods are determined using a test article of the battery and those time periods are then predefined for use in the production batteries used in actual aircraft. In other embodiments, the determination of the power-on time period and the power-off time period are executed on the battery in situ.

The discharge cut-off voltage use to find the power-on and power-off time periods is selected to prevent damage to the electrochemical cells caused by overdischarging the battery at cold temperatures. The target temperature for the device to stop using the heater to heat the electrochemical cells may be greater than the melting point of the electrolyte utilized in the electrochemical cells.

In other embodiments of the method, the electrical heater is used to heat one or more electrochemical cells disposed in the battery case by selecting an initial duty cycle, and repeatedly discharging the electrochemical cells through the electrical heater for the duty cycle, and modifying the percentage of the duty cycle as the temperature of the electrochemical cells increase from the applied heat. In some embodiments of this method, the duty cycle is modified based on the temperature of the electrochemical cells by monitoring the temperature of the electrochemical cells, and increasing the duty cycle to a higher value when the temperature of the electrochemical cells exceeds a threshold temperature. Then, after the electrochemical cells reaches the final threshold temperature, the duty cycle is decreased or terminated. In some embodiments of the method, the duty cycle may be increased to a second higher value when the temperature of the electrochemical cells exceeds a second higher threshold temperature. The second threshold temperature may be equal to or greater than the melting temperature of the electrolyte in the electrochemical cells.

After the electrochemical cells reach the final threshold temperature, the duty cycle may be reduced by an incremental value each time the temperature of the electrochemical cells increases by an incremental value. The incremental value by which the duty cycle is reduced may be 10% in some embodiments. The second incremental value by which the temperature increase is measured may be 1 degree C. in certain embodiments.

In some other embodiments, the duty cycle is selected by determining a power-on time period and a power-off time period, and then calculating the duty cycle as the ratio of the power-on time period to the sum of the power-on time period and the power-off time period. As described before, the power-on time period may be determined by discharging the electrochemical cells through the heater and measuring the time required for the battery voltage to fall to a discharge cut-off voltage value. Similarly, the power-off time period may be determined by disconnecting the electrochemical cells from the electrical heater and measuring the time period required for the voltage of the electrochemical cells to recover to its open circuit voltage. The determination of the power-on time period and the power-off time period may be performed at a selected temperature or using a test article of the battery.

DETAILED DESCRIPTION OF THE INVENTION

The battery heater systems and methods described herein include a battery with an internal heating element, a temperature transducer, a voltage meter, and an electronic controller. The temperature transducer provides a signal, whether analog or digital, representative of the temperature of the battery. The voltage meter provides a measurement of the voltage between the terminals of the battery or any combination of electrochemical cells within the battery. The internal heating element is an electrical-powered heating element, such as a resistive heating element, that is disposed within the battery case. The electronic controller is designed or programmed to execute one or more of the embodiments of the method of using the battery heater system.

Since, as described in the background section, the cold-soaked battery is not capable of providing sufficient continuous current at an appropriate voltage to power the heating element, the controller operates the heating elements using the battery's power in an intermittent or pulsed manner. The pulses may be controlled in a variety of ways and algorithms, such as a duty cycle, a fixed time duration discharge, or a fixed voltage drop discharge, among others. At the beginning of the battery heating operation, each pulse provides very little heating effect because of the condition of the battery. However, as the battery slowly warms it becomes more quickly able to provide power to the heating element in each pulse, and the heating effect proceeds at a faster rate.

The repetitive pulse discharge of the battery through the heating element eventually results in some warming and thawing of the battery electrolyte which then decreases the electrolyte's internal resistance. The lower internal resistance enables the electrochemical cell to maintain higher voltages for a given current. This leads to a decrease in the voltage drop in each pulse. As the battery become capable of discharging at a higher voltage during each pulse at the same amplitude of current, more power (current×voltage=power) is delivered to the heaters. As more power is discharged from the electrochemical cells, the electron and lithium ion flows cause more internal heating of the electrolyte, and there is more external heat delivered to warm the electrochemical cells from the heating element on the cell cases. The rate of heat transfer into the electrolyte increases as the electrolyte gets warmer. When the battery is warmed to certain temperatures, the battery becomes capable of delivering more current while maintaining its voltage above the recommended minimum end point voltage/cut-off voltage. At different temperatures, the battery then becomes capable of providing electrical energy to other loads such as aircraft avionics, starters for main engines or auxiliary power units, cabin amenities, or lights.

The device and methods allow a user to actuate the battery heater system using a simple switch or button. There is no need to remove or reinstall the battery from the aircraft, or to provide an external power source to power a heating element in the battery. The inventive methods of operating the heater system, including the timer component, prevent damage to the cold battery as a result of discharging it for too long before it has warmed up sufficiently. The inventive methods also allow the battery heater system to self-heat at temperatures where normal methods would not function due to the drop in voltage caused by a full power discharge.

Figure 1:
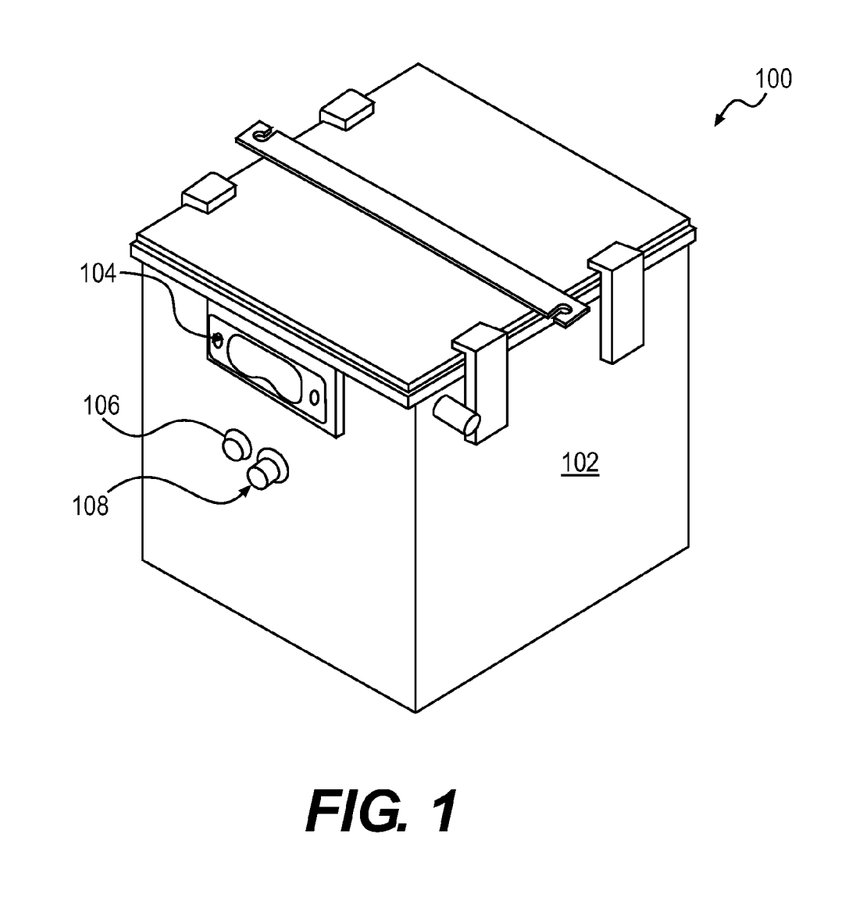
FIG. 1 is a perspective view of a lithium ion battery with an embodiment of the heater installed in the battery.

Referring now to FIG. 1, a perspective view of a lithium ion battery 100 is depicted. The lithium ion battery 100 is typically provided with a case 102 for containing the electrochemical cells and other components of the battery 100. The case 102 is provided with an output receptacle 104 or other means of electrically connecting the battery to the aircraft electrical systems. In some embodiments of the battery heater system, the case 102 is provided with a button 106 for manual activation of the heater, indicator light 108 as an indicator of the status of the heater operation, or both. In some embodiments, the button 106 and light 108 may comprise a single component serving both functions. In other embodiments no button 106 or light 108 may be provided, and other means of activating the heater may be provided such as an electronically activated heater.

Figure 2:
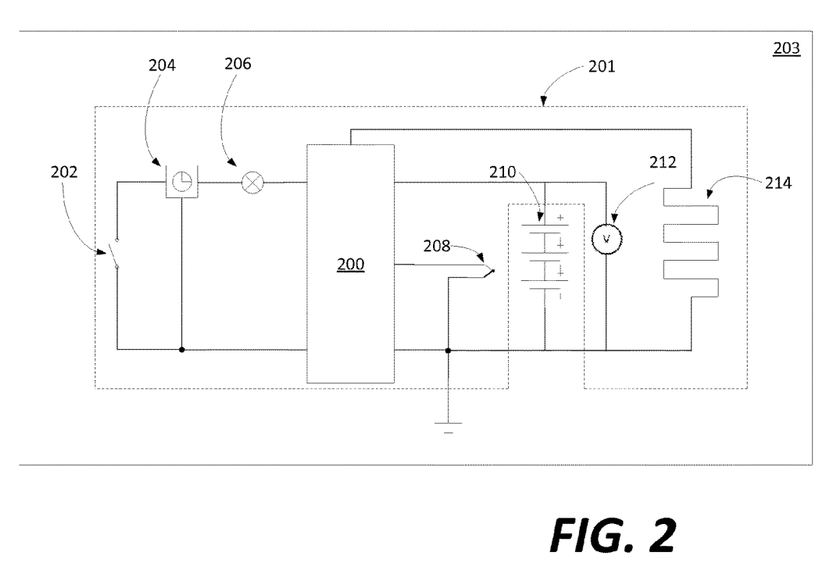
FIG. 2 is an electrical schematic of an embodiment of the lithium ion battery heater device.

Referring now to FIG. 2, an electrical schematic of an embodiment of the battery heater system 201 inside a lithium ion battery 203 is depicted. The battery is provided with temperature electronic controller 200, embodiments of which may comprise an integrated circuit running software developed to embody the methods described herein. In other embodiments, the control electronics may comprise analog or digital hardware components combined to embody the methods described herein.

A switch 202 is provided for actuating the battery heater system. As described in relation to FIG. 1 in various embodiments of the heater, switch 202 may comprise a button 106 allowing a user to manually engage the heater by depressing the button 106. In other embodiments, switch 202 may comprise an electronic switch capable of being actuated electronically. The method of actuating switch 202 is not limiting of the invention as switch capable of actuating the circuit may be used in varying embodiments of the heater.

A timer 204 is provided for limiting the length of time that the battery heater system remains in operation. This is intended to prevent the accidental draining of the battery by lengthy heating of the battery. At the end of the prescribed time period, the timer 204 shuts off the battery heater system to prevent unnecessary continued heating of the battery when it is not required by the user. The length of the time may vary depending on the specific characteristics of the battery and the conditions under which the heater will be used. In some embodiments the timer 204 may limit the battery heater system to 2 hours of continuous operation. The operation of timer 204 is not depicted in FIGS. 3B, 4B, 5B, and 5C but the timer does limit the length of operation of the methods depicted in those figures.

A status indicator 206 may be provided for indicating that the battery heater system is in operation. In some embodiments status indicator 206 may be a light 108. In other embodiments, no status indicator may be provided, or the indicator may comprise an indicator on a remote control panel outside the battery. Similarly, in other embodiments electronic controller 200 may provide a status indicator 206 via a data connection to the avionics of the aircraft.

Once the battery heater switch is actuated, electronic controller 200 initiates the operation of the battery heater system. The electronic controller 200 utilizes a temperature transducer 208 to monitor the temperature of the electrochemical cells 210 in the battery. A voltage meter 212 is also provided to measure the voltage between the terminals of the battery or any combination of electrochemical cells. In various embodiments, electronic controller 200 may utilize the voltage measured by meter 212 in controlling the operation of the heater.

One or more heating elements 214 are provided to heat the electrochemical cells 210 using electrical power from the electrochemical cells 210. In the embodiment depicted if FIG. 2, only a single heating element 214 is depicted, though depending on the configuration of a particular embodiment, multiple heating elements 214 may be provided. The heating element 214 is activated and powered through electronic controller 200. The heating elements 214 generate heat from electrical energy stored in the electrochemical cells 210.

Electronic controller 200 may access measurements of the battery temperature from transducer 208, and the voltage of the battery terminals from voltage meter 212. The control electronics also turns the heating element 214 on and off by applying voltage to it or removing the voltage from it. The voltage and resulting current is provided by the electrochemical cells 210. As described above, if the electrochemical cells 210 are cold, improper heating of the electrochemical cells 210 using heating element 214 may occur since the battery voltage will quickly fall below its discharge cut-off voltage without having produced any internal or external heat in the electrochemical cells 210. However, in various embodiments of the battery heater system, the electronic controller 200 is programmed or designed to heat the electrochemical cells 210 in a manner that will not cause the battery voltage to fall below its discharge cut-off voltage, but will enable it to maintain the battery voltage above its discharge cut-off voltage sufficiently to heat the electrochemical cells 210 so that the battery is still operational to provide sufficient current to start the airplane engines.

Figure 3A:
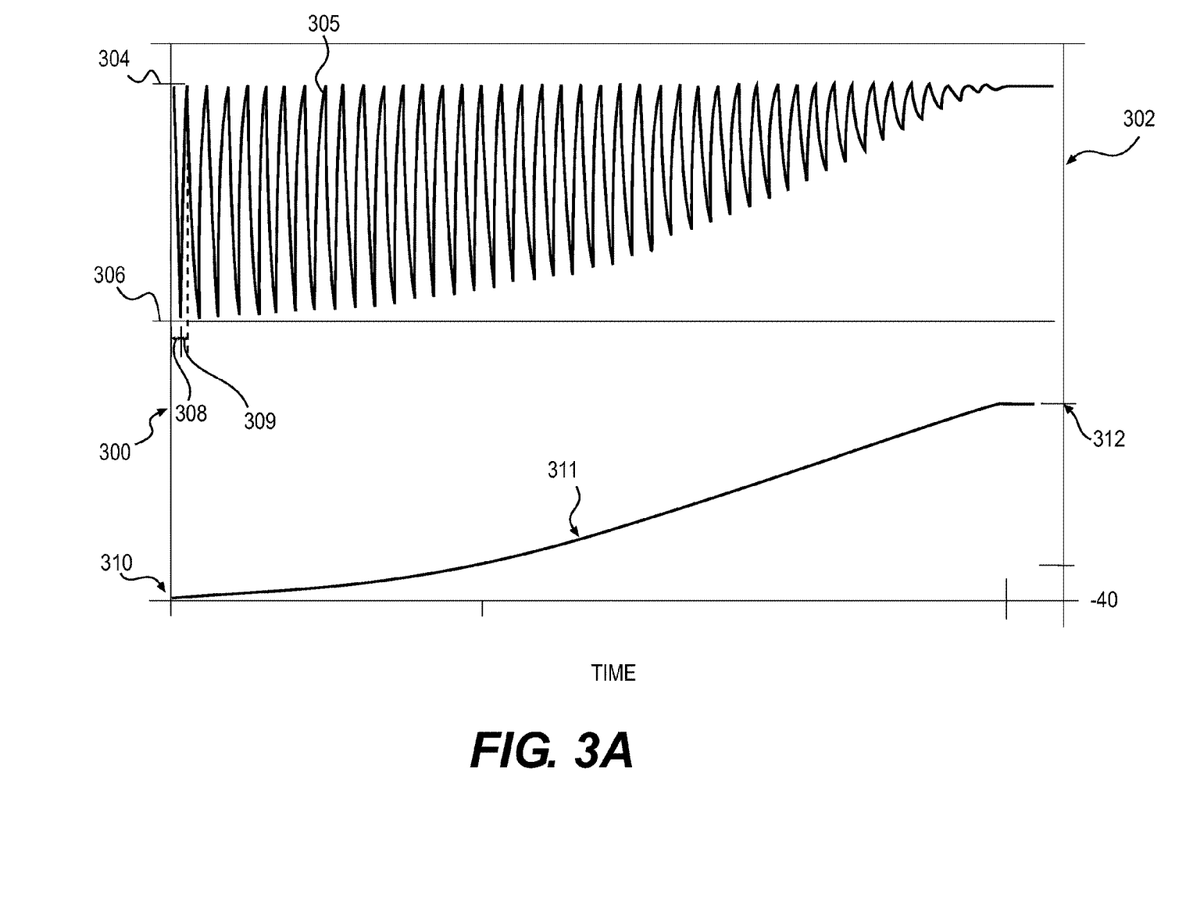
FIG. 3A is a graph of the voltage and temperature of an exemplary lithium ion battery during operation of an embodiment of the lithium ion battery heater system.
Figure 4A:
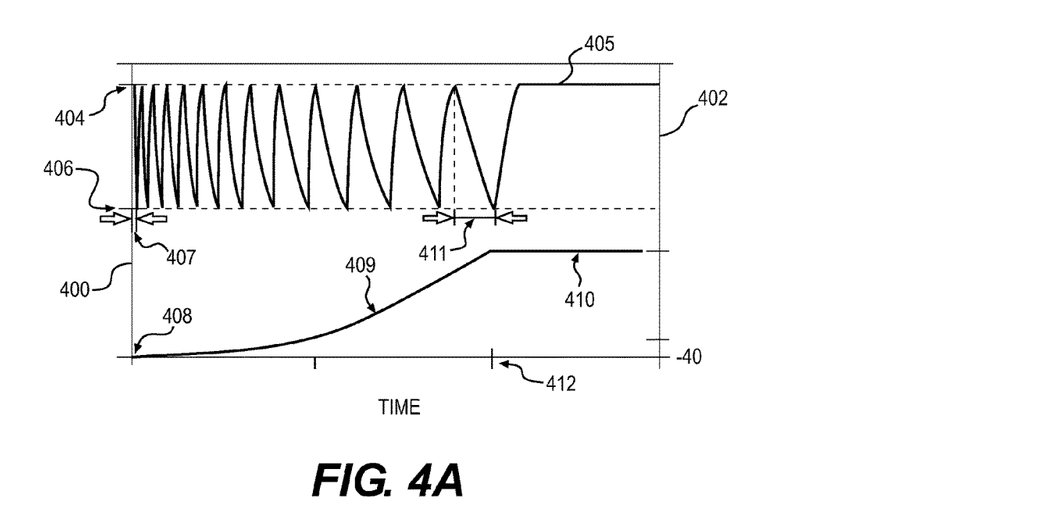
FIG. 4A is a graph of the voltage and temperature of an exemplary lithium ion battery during operation of a second embodiment of the lithium ion battery heater system.

Referring now to FIGS. 3A and 4A, the operation of various embodiments of the battery heater system are depicted. The graphs have two vertical axes. Axes 300 and 400 display the battery voltage measured by voltage meter 212. Axes 302 and 402 display the temperature of the battery measured by transducer 208.

Figure 3B:
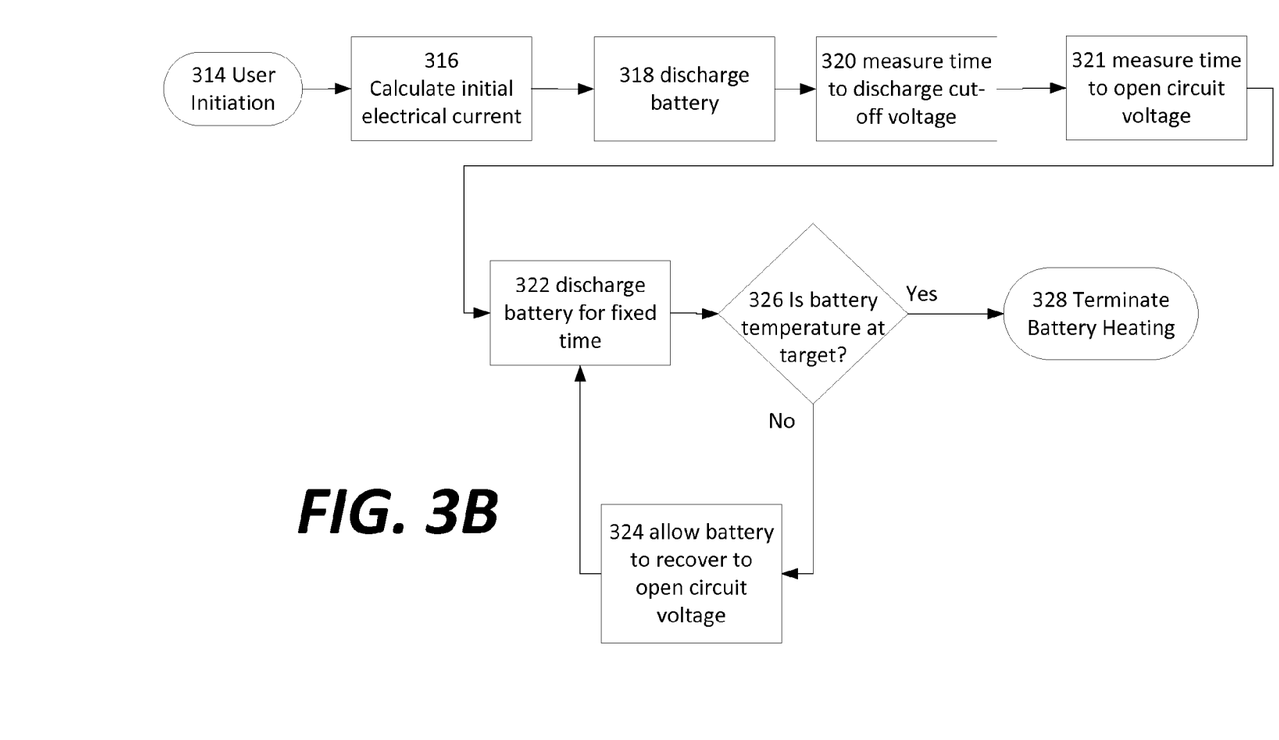
FIG. 3B is a diagram of an embodiment of a method of operating the lithium ion battery heater system.

Referring now to FIGS. 3A and 3B, a first embodiment of a method of operating an embodiment of the battery heater system is depicted. In this method, the electrical heating element is powered cyclically based on a fixed time duration. The heating element is powered for a fixed time, and then powered off until the battery recovers to its open circuit voltage.

The process begins at step 314 with the actuation of the battery heater system by a user causing switch 202 to close by pressing button 106 or otherwise activating the battery heater system as described above. Indicator 206 provides feedback to the user that the battery heater system has been activated and that it is in operation. The indicator 206 may flash or provide different feedback to indicate to the user when different phases of the process are ongoing, such as when the heating element is currently active, for example.

In the first method, the heating element 214 is operated for a fixed power-on time period 308 for each heating cycle and then powered off for a fixed power-off time period 309. The fixed power-on time period 308 is determined by an initial discharge cycle of the cold-soaked battery, for example at −40 degrees Celsius. An initial discharge current is calculated by dividing the wattage of the heating element 214 by the open circuit voltage 304 of the battery 214. The electrochemical cells 210 are discharged at step 318 at the initial discharge current determined at step 316 through heating element 214. As the electrochemical cells 210 discharge, electronic controller 200 monitors the voltage 305 of the electrochemical cells 210. At step 320, the electrochemical cells 210 are discharged until the battery voltage 305 drops to the discharge cut-off voltage 306 and the elapsed time during the discharge step is measured for the power-on time period 308. Then at step 321 the heater is disconnected from the battery and the time to recover to open circuit voltage is measured for the power-off time period 309. In some embodiments this step may take place under controlled circumstances such as a laboratory setting at a selected temperature such as −40 degrees C. to determine fixed values to use, which are then stored in the electronic controller 200 for use on an aircraft or inside a production battery.

The discharge cut-off voltage 306 is a predetermined value, which in some embodiments may be 16 volts for a battery with an open circuit voltage of 26 volts. The discharge cut-off voltage 306 is selected to prevent damage or total discharge of the cold battery. The heating element 214 is then shut off by electronic controller 200. The time 308 that it took for the battery voltage 305 to drop from voltage 304 to voltage 306 is the fixed power-on time period 308 to be used by the method. The fixed power-off time period 309 is similarly determined by measuring the time required for the battery voltage 305 to recover from the discharge cut-off voltage 306 to the open circuit voltage 304. In some embodiments, the fixed power-on time period 308 and the fixed power-off time period 309 are determined experimentally at a selected temperature such as −40 degrees C. and then stored as data values for use in electronic controller 200. In other embodiments, the two time periods may be determined during the first discharge cycle as the battery heater system begins operation. The determination of the power-on time period and the power-off time period may be performed on a test article of the battery and then used in other similar batteries.

In some embodiments, the heating element is then powered off for the fixed power-off time period 309. This allows the battery voltage 305 to recover to the open circuit voltage and after the power-off time period 309 the heater is turned back on for the power-on time period 308. Since the electrochemical cells 210 have been heated by the previous period of heating, the voltage 305 does not drop all the way to voltage 306. When the fixed power-on time period 308 has elapsed, the heating element 214 is disconnected and the current flow through element 214 is stopped. The electronic controller 200 repeats the cycle of waiting for the fixed power-off time duration 309, at which time the process may repeat or the battery heating method may terminate as described in more detail below.

The electronic controller 200 continues to monitor the voltage 305 of the electrochemical cells 210. At step 326 the control electronics determines if it is necessary to continue heating the electrochemical cells 210. If the temperature 311 of the electrochemical cells 210 has reached the target temperature 312 then the battery heater system deactivates. If the temperature 311 of the electrochemical cells 210 has not yet reached the target temperature 312, steps 324 and 322 are repeated. At step 324 the voltage 305 is allowed to recover to open circuit voltage 304 for the power-off time period, and at step 322 the electrochemical cells 210 are discharged through the heater 214 for the fixed power-on time duration 308. This cycle is repeated, and in each cycle the voltage 305 falls less over time 308 as the electrochemical cells 210 heat up until they reach the target temperature 312. In some embodiments step 324 may take place before step 326. In other words, in some embodiments the controller 200 may allow the battery voltage 305 to recover prior to determining whether to terminate the heating process. In some embodiments, the target temperature 312 is greater than the melting point of the electrolyte used in the electrochemical cells.

In some embodiments of the invention, the power-on time period and the power-off time period comprise a duty cycle for the heater. The duty cycle may be calculated as the ratio of the power-on time period over the sum of the power-on time period plus the power-off time period. The calculated ratio or percentage may then be applied over a repeating cycle whose unit time length is equal to the power-on time period plus the power-off time period.

The electrochemical cells 210 begin at a temperature 311 equal to the cold-soaked temperature 310. Temperature 311 increases due to the heating cycles until it reaches the target temperature 312. In some embodiments the target temperature is 10 degrees Celsius, though the target temperature may vary depending on the type of electrochemical cells 210. The target temperature 312 should be sufficient so that normal usage of the electrochemical cells 210 for operation of aircraft systems will not damage or totally discharge the electrochemical cells 210.

Figure 4B:
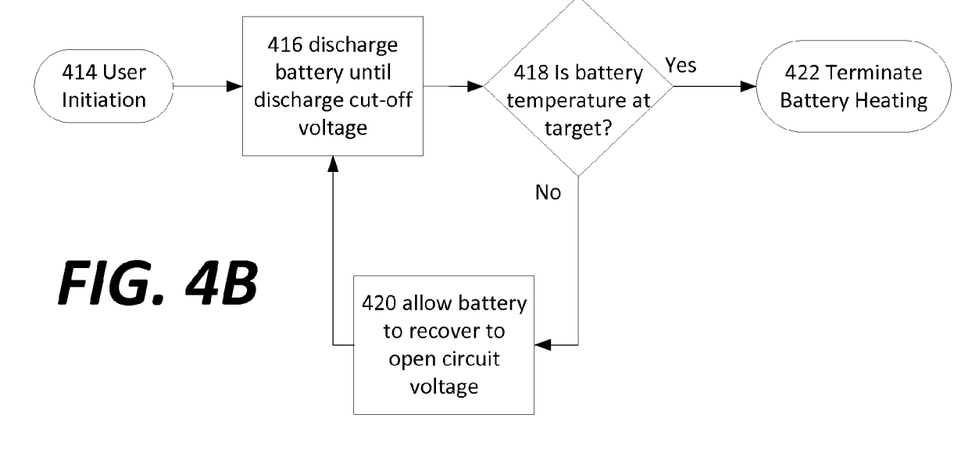
FIG. 4B is a diagram of an embodiment of a method of operating the lithium ion battery heater system.

Referring now to FIGS. 4A and 4B, a second embodiment of a method of operating an embodiment of the battery heater system is depicted. The process begins at step 414 with the actuation of the battery heater system by a user causing switch 202 to close by pressing button 106 or otherwise activating the battery heater system as described above. Indicator 206 provides feedback to the user that the battery heater system has been activated and that it is in operation. The indicator 206 may flash or provide different feedback to indicate to the user when different phases of the process are ongoing, such as when the heating element is currently active, for example.

In the second method of operating the battery heater system, the heating element 214 is operated periodically at step 416, with each period continuing until the battery voltage 405 drops to the discharge cut-off voltage 406. Once the battery voltage 405 reaches the discharge cut-off voltage 406, the heating element 214 is turned off and the battery voltage 405 allowed to recover to the open circuit voltage 404. Once the battery voltage 405 recovers to the open circuit voltage 404, the electronic controller 200 switches the heating element 214 back on and discharges it until the battery voltage drops again to the discharge cut-off voltage 406. As the temperature 409 of the electrochemical cells 210 increases and the viscosity of the electrolyte decreases, the battery voltage 405 decreases more slowly during the discharge phase and the heating periods lengthen, as can be seen by comparing the lengths of time period 407 and time period 411.

The temperature 409 begins at initial cold-soaked temperature 408 and increases as a result of the periodic activation of heating element 214 until it reaches target temperature 410, at which time the battery heater system is deactivated by electronic controller 200. Target temperature 410 is selected so that the normal usage of the electrochemical cells 210 for operation of aircraft systems will not damage or totally discharge the electrochemical cells 210.

Figure 5A:
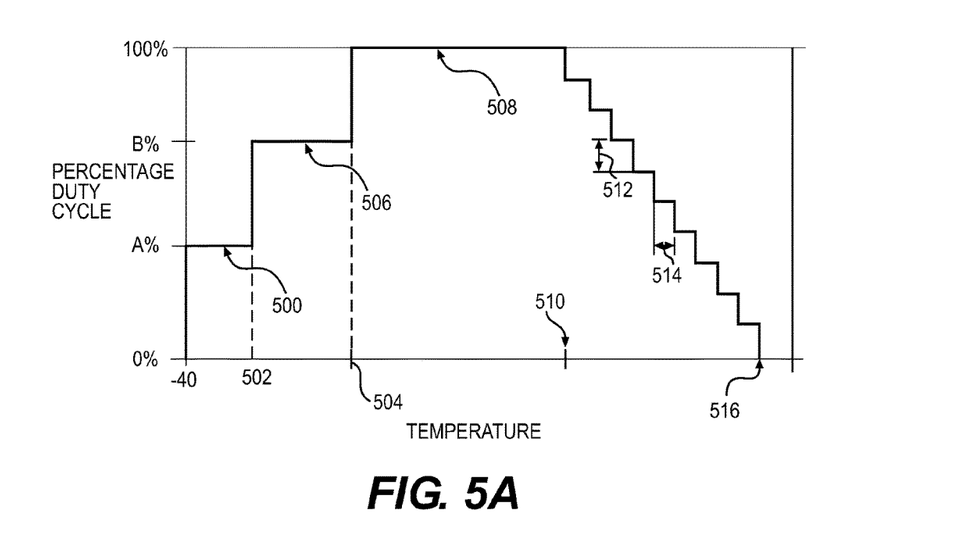
FIG. 5A is a graph of the duty cycle of an exemplary lithium ion battery during operation of a third embodiment of the lithium ion battery heater system.
Figure 5B:
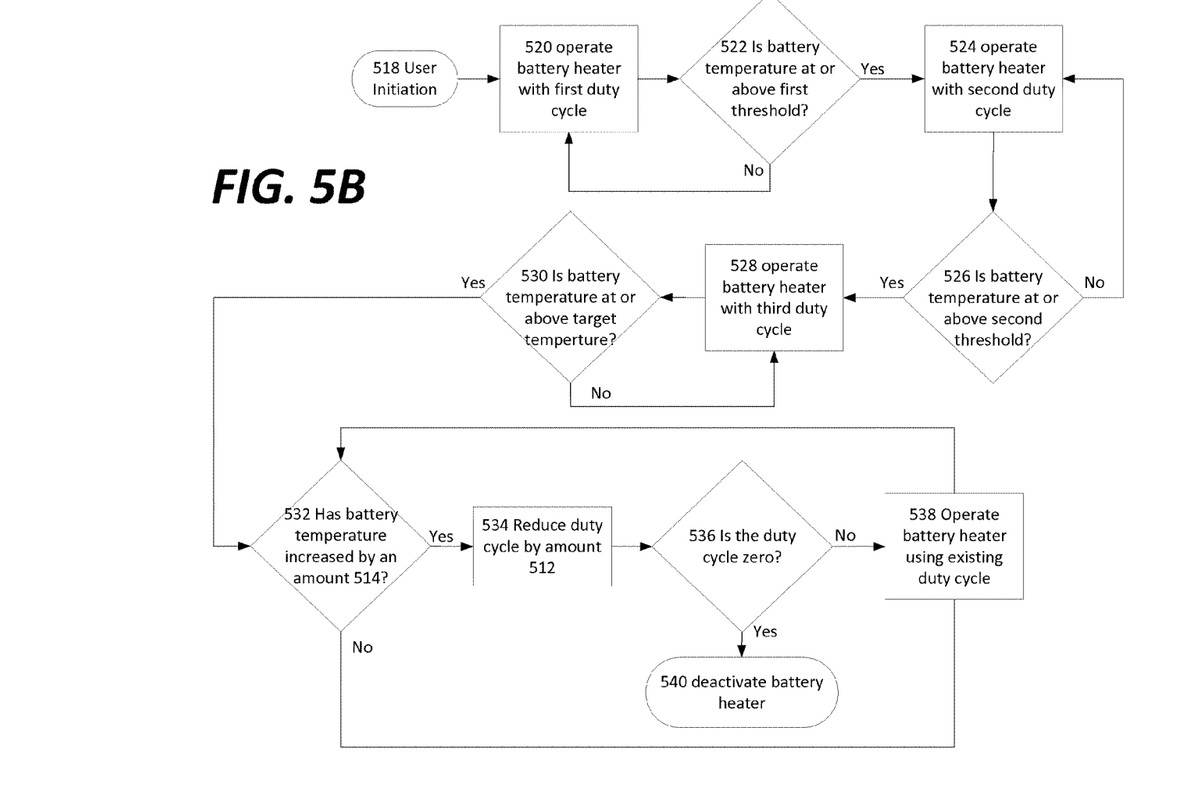
FIG. 5B is a diagram of an embodiment of a method of operating the lithium ion battery heater system.

Referring now to FIGS. 5A and 5B, a graph of the duty cycle of the battery heater system in a third embodiment of the method of operating the battery heater system and a flow diagram of the embodiment of the method are depicted, respectively. The duty cycle comprises the percentage of a given time period during which the electrochemical cells are discharged through the electrical heater. The third embodiment of the method activates the heater using a duty cycle for the heating element 214 that varies based on the temperature of the electrochemical cells 210. The duty cycle percentage and duration used by the method for a given temperature are pre-defined based on the characteristics of the battery and the battery heater system. In one embodiment, the duty cycle may be defined based on experimental data and testing to prevent the battery voltage from dropping below the battery discharge cut-off voltage during a duty cycle. For example and not by way of limitation, a certain battery at −40 degrees C. may be able to maintain voltage above the discharge cut-off voltage while discharging current through the heating element for 2.5 seconds (50%) of a 5 second duty cycle, while at −30 degrees C. the battery voltage may remain above the discharge cut-off voltage for 100% of the 5 second duty cycle. In another embodiment, a certain battery at −40 degrees C. may be able to maintain voltage above the discharge cut-off voltage while discharging current through the heating element for 2.2 seconds (55%) of a 4 second duty cycle, while at −20 degrees C. the battery voltage may remain above the discharge cut-off voltage for 100% of the 4 second duty cycle One or more temperature thresholds or transitions may be defined providing for the application of different duty cycle values for different battery temperatures. For example, a threshold temperature 502 may be defined whereby the duty cycle below temperature 502 is a first value 500 and the duty cycle at or above temperature 502 is a second larger value 506. Another example of a threshold may be at battery temperatures around the melting temperature of the battery electrolyte whereby the battery heater system operates with a first duty cycle when operating below the melting temperature and at a second duty cycle when operating at or above the electrolyte melting temperature.

In other embodiments, a single threshold 502 may be provided or additional thresholds such as 504 may be provided at varying temperatures above or below 502. In some embodiments, duty cycle 500 is 50% and temperature 502 is −35 degrees C. In some embodiments, duty cycle 506 is 75% and temperature 504 is −30 degrees C. In some embodiments, duty cycle 508 is a 100% duty cycle.

In some embodiments, once the battery temperature reaches a target temperature 510, the battery heater system may be deactivated. In some embodiments the battery heater system is not immediately turned completely off, but the duty cycle of the heater is decreased until the battery heater system is deactivated at the heater shut-off temperature 516. In the embodiment shown in FIG. 5A, the duty cycle is reduced by an amount 512 for each increase 514 in battery temperature. In some embodiments the duty cycle reduction amount 512 is 10% and the temperature increase is 1 degree C., causing the duty cycle of the battery heater system to decrease by 10% for each 1 degree C. above the target temperature 510 until the battery heater system is deactivated at the heater shut-off temperature 516.

Referring now to FIG. 5B, the method of operating an embodiment of the battery heater system is depicted according to the embodiment shown in FIG. 5A. Once a user initiates the battery heater system in step 518, the heater initially operates using a first duty cycle as described above in relation to FIG. 5A. The system monitors the battery temperature at stop 522, either continuously or periodically, to determine if the battery temperature has reached a first threshold 502. The temperature monitoring in step 522 may take place in parallel with the operation of the heater in step 520 and they both may continue simultaneously with step 522 causing the system to break out of step 520 when the target is reached, or the temperature may be checked at a specific time during each duty cycle before beginning the next duty cycle of heating. The embodiment of the method depicted in FIG. 5B is intended to encompass both continuous and periodic temperature monitoring, and parallel or sequential operation of steps 520 and 522.

Once the battery temperature exceeds the target in step 522, the heater is then operated with the second duty cycle such as duty cycle 506 at step 524. Again, in step 526, the temperature of the battery is checked and compared to another threshold temperature 504. As described above, steps 524 and 526 may be sequential or operate in parallel. In the depicted embodiment a second threshold temperature 504 is utilized to change to a third duty cycle value 508.

In the depicted embodiment and method, once the battery temperature reaches the second threshold 504 at step 526, step 528 then operates the heater at the third duty cycle value 508. In the depicted embodiment, the value 508 is 100%. In other embodiments, there may only be one threshold temperature or more than two threshold temperatures, and other values of duty cycle may be utilized for 500, 506, and 508. At step 530, electronic controller continues to monitor the battery temperature to determine if it is above a third threshold. As described above with respect to other monitoring and heating steps, steps 528 and 530 may operate sequentially in a loop or continuously and in parallel. Step 528 continues to operate the heater until the battery reaches a target temperature 510. In some embodiments, target temperature is 10 degrees C., but it may vary in other embodiments depending on the battery specification and other circumstances.

In some embodiments, the electronic controller 200 may shut off the heater after the battery reaches the target temperature 510. In other embodiments, such as those depicted in FIGS. 5A and 5B the electronic controller 200 reduces the duty cycle incrementally. In step 532, electronic controller checks to determine if the battery temperature has increased by an incremental amount 514. If not, at step 538 electronic controller 200 continues to operate the heater at the previous duty cycle. If the battery temperature has increased by at least increment 514, the duty cycle is reduced at step 534 by the predetermined amount 512. In some embodiments, the increment 514 is 1 degree C. and the duty cycle reduction 512 is 10%. These values may vary in other embodiments. If the reduction in duty cycle causes the duty cycle to reduce to zero at step 536 then the battery heater system is terminated at step 540. If the duty cycle has not yet reached zero percent, the battery heater system continues to operate at step 538. Steps 532 and 538 may operate sequentially or in parallel and continuously.

Figure 5C:
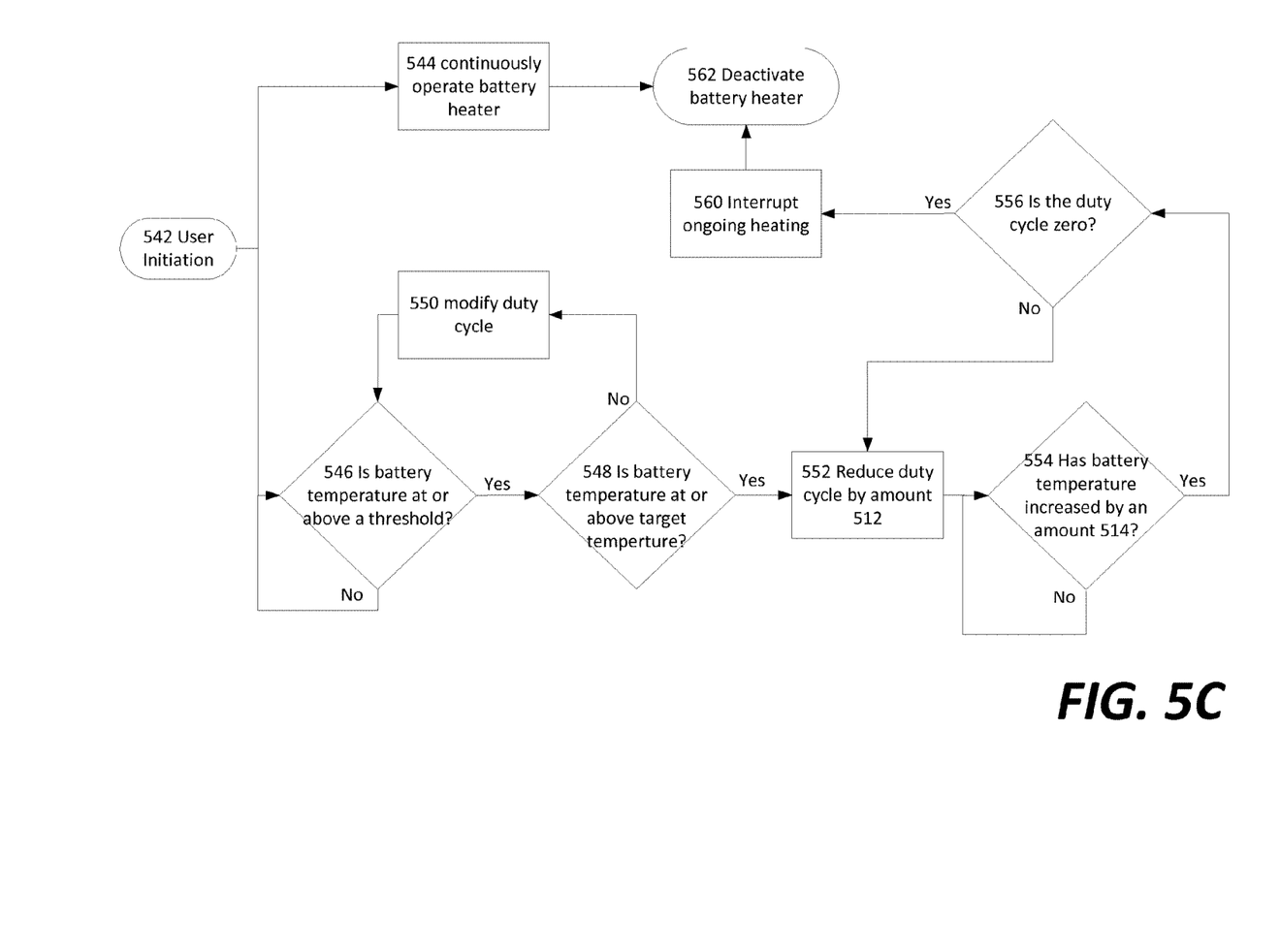
FIG. 5C is a diagram of another embodiment of a method of operating the lithium ion battery heater system.

Referring now to FIG. 5C, another embodiment of the method of operation shown in FIG. 5A is depicted. The method depicted in this figure produces the same duty cycle profile depicted in FIG. 5A but highlights the parallel and continuous nature of the temperature monitoring and heating operations in some embodiments. As with the prior method, a user initiates the heater at step 542. The electronic controller 200 begins heating the battery at step 544 using the initial setting for the duty cycle value, such as value 500. This heating process is performed continually until interrupted by a later step in the process. Although it is continuous the duty cycle value used by the controller 200 to operate the heater may be altered at other steps in the process without stopping the continuous operation of the heater.

While step 544 runs continuously, the electronic controller 200 monitors the battery temperature at step 546 to determine if it has reached or exceeded one of the thresholds defined for that embodiment of the method. As discussed above, the number and value of the thresholds may vary in different embodiments. If a threshold has been reached the controller increases the current duty cycle to the new value, such as value 506 at step 550. It may also perform a check at step 548 to determine if the battery temperature is above the final target temperature at which heating will be terminated or reduced, such as temperature 510. The heater continues to heat the battery throughout this process, and continues to do so as the duty cycle used to operate it is modified by controller 200.

When the battery temperature does reach the target temperature 510, step 548 redirects the method to step 552 and causes the duty cycle to be reduced to begin tapering off the heater. In some embodiments the heater may terminate at temperature 510, but in the depicted embodiment, the duty cycle is reduced at step 552 by a percentage 512 at temperature 510 and by another amount 512 for each increase in battery temperature of value 514. This is depicted as steps 552 and 554. If the duty cycle is reduced to zero then step 556 redirects the process to interrupt the operation of the heater at step 560 and the battery heater system is deactivated at step 562.

In some embodiments, the various methods described above or other embodiments may be used in combination in a single battery. For example the method depicted in FIGS. 3A and 3B might be used for one temperature range, while the method depicted in FIGS. 4A and 4B or FIGS. 5A and 5B might be used for another temperature range.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. An automated battery heating system capable of operating in cold weather environments, comprising:
   a heating element thermally coupled to a battery for heating the battery, wherein the battery is electrically coupled to the heating element for supplying electrical current to the heating element;
   an electronic controller programmed to operate the automated battery heating system, the electronic controller being communicatively coupled to the heating element for delivering electrical current from the battery to the heating element;
   a voltage meter electrically coupled to the battery and communicatively coupled to the electronic controller for monitoring a battery voltage, wherein the electronic controller delivers electrical current from the battery to the heating element based on information received from the voltage meter;
   a temperature transducer thermally coupled to the battery and communicatively coupled to the electronic controller for monitoring a battery temperature, wherein the electronic controller delivers electrical current from the battery to the heating element based on information received from the temperature transducer; and
   the heating element is powered cyclically to gradually heat the battery while avoiding a decline in the battery voltage below a predetermined discharge cut-off voltage greater than zero.

2. The automated battery heating system of claim 1, further comprising a switch for enabling a user to engage the automated battery heating system.

3. The automated battery heating system of claim 1, further comprising a timer for limiting the amount of time that the automated battery heating system remains in operation for preventing unintended draining of a charge of the battery.

4. The automated battery heating system of claim 1, further comprising a status indicator for indicating that the automated battery heating system is in operation.

5. The automated battery heating system of claim 1, wherein the electronic controller delivers electrical current from the battery to the heating element repeatedly based on a first duration of time on and a second duration of time off.

6. The automated battery heating system of claim 4, wherein the second duration of time off is based on an amount of time for the battery to recover to its open circuit voltage when the battery is at a cold-soaked temperature.

7. The automated battery heating system of claim 1, wherein the electronic controller delivers electrical current from the battery to the heating element repeatedly based on a voltage drop to a discharge cut-off voltage, the voltage drop being measured via the voltage meter.

8. The automated battery heating system of claim 1, wherein the electronic controller provides electrical current from the battery to the heating element repeatedly based on a percentage of a duty cycle.

9. The automated battery heating system of claim 1, wherein the electronic controller provides electrical current from the battery to the heating element repeatedly based on a percentage of a duty cycle, the percentage being based on a temperature measured via the temperature transducer.

10. The automated battery heating system of claim 9, wherein the electronic controller provides electrical current from the battery to the heating element repeatedly based on a first percentage of a duty cycle for a first temperature and a second percentage of a duty cycle for a second temperature.

11. The automated battery heating system of claim 10, wherein the first temperature is below a melting temperature of an electrolyte of the battery, and the second temperature is at or above the melting temperature of the electrolyte of the battery.

12. The automated battery heating system of claim 9, wherein the duty cycle duration is decreased incrementally when the battery temperature reaches a target temperature.

13. An automated battery heater system for heating a cold-soaked battery having electrochemical cells, the battery heater system comprising:
   an electronic controller, a temperature transducer attached to the electronic controller for measuring a temperature of the battery, a voltage meter attached to the electronic controller for measuring a voltage of the battery, a heating element controlled by the electronic controller for heating the battery, an indicator operated by the electronic controller for indicating whether the heating element is operational, a switch for activating the electronic controller, and a timer circuit for deactivating the electronic controller;
   wherein the electronic controller is programmed with an algorithm to operate the heating element cyclically using power from the electrochemical cells to heat the battery gradually while avoiding a decline in the voltage below a predetermined discharge cut-off voltage greater than zero.

14. The automated battery heater system of claim 13, wherein the battery is for an aircraft operated in a cold weather environment.

15. The automated battery heater system of claim 13, wherein the battery is for a vehicle operated in a cold weather environment.

16. The automated battery heater system of claim 13, wherein the battery is used in a mobile device.

17. The automated battery heater system of claim 16, wherein the battery is used in a mobile phone.

18. The automated battery heater system of claim 17, wherein the mobile device is a mobile computer.

\* \* \* \* \*